(12) United States Patent
Torresan et al.

(10) Patent No.: US 11,117,363 B2
(45) Date of Patent: Sep. 14, 2021

(54) METHOD FOR MAKING AN ORNAMENTAL ARTICLE

(71) Applicant: NUOVI GIOIELLI S.R.L., Mussolente (IT)

(72) Inventors: Ivano Torresan, Mussolente (IT); Damiano Carlesso, Cassola (IT)

(73) Assignee: NUOVI GIOIELLI S.R.L., Mussolente (IT)

( * ) Notice: Subject to any disclaimer, the term of this patent is extended or adjusted under 35 U.S.C. 154(b) by 239 days.

(21) Appl. No.: 16/387,623

(22) Filed: Apr. 18, 2019

(65) Prior Publication Data
US 2019/0322097 A1    Oct. 24, 2019

(30) Foreign Application Priority Data

Apr. 20, 2018   (IT) .................... 102018000004760

(51) Int. Cl.
| | |
|---|---|
| *B33Y 10/00* | (2015.01) |
| *B33Y 80/00* | (2015.01) |
| *B33Y 70/00* | (2020.01) |
| *A44C 27/00* | (2006.01) |

(52) U.S. Cl.
CPC .......... *B33Y 80/00* (2014.12); *A44C 27/002* (2013.01); *B33Y 10/00* (2014.12); *B33Y 70/00* (2014.12); *Y10T 29/4959* (2015.01)

(58) Field of Classification Search
CPC ....... A44C 27/002; A44C 27/00; A44C 5/102; A44C 11/00; Y10T 29/4959; B22F 7/062; B22F 2998/10; B22F 2003/247
See application file for complete search history.

(56) References Cited

U.S. PATENT DOCUMENTS

| | | | |
|---|---|---|---|
| 6,772,580 B2 * | 8/2004 | Seliktar | A44C 27/002 59/80 |
| 9,027,320 B2 | 5/2015 | Nevatia | |
| 2006/0213048 A1 * | 9/2006 | Kalanovic | B25J 17/0283 29/468 |
| 2018/0009172 A1 * | 1/2018 | Amba | B29C 64/40 |

FOREIGN PATENT DOCUMENTS

| | | | | |
|---|---|---|---|---|
| CH | 700273 A1 * | 7/2010 | | A44C 27/00 |
| CN | 106235540 A | 12/2016 | | |
| CN | 107136673 A | 9/2017 | | |
| EP | 3403522 | 11/2018 | | |

\* cited by examiner

*Primary Examiner* — Sarang Afzali
(74) *Attorney, Agent, or Firm* — Mark M. Friedman (57) ABSTRACT

Method for making an ornamental article, which envisages a step for arranging, in a 3D printer, a finish plate made of metallic material provided with an inner face and an outer face, and an augmenting step for augmenting, in the 3D printer, an ornamental body formed by a plurality of separate connection elements mechanically engaged with each other, wherein the augmenting step is attained by means of successive welding of metal powder layers, so to fix the plurality of connection elements of the ornamental body to the finish plate. The method further comprises a step for cutting the finish plate into a plurality of separate surface elements adjacent to each other and mechanically connected to the plurality of connection elements.

7 Claims, 9 Drawing Sheets

METHOD FOR MAKING AN ORNAMENTAL ARTICLE

FIELD OF THE INVENTION

The present invention regards a method for making an ornamental article.

The method for making the aforementioned article is intended to be used in the ornamental article manufacturing industry and in particular in the jewellery industry.

The method subject of the present invention is also intended to be used in the ornamental articles manufacturing industry such as for example the watch-making industry for producing watch straps or in the costume jewellery industry for example for producing non-precious metal bracelets.

The ornamental article obtained through the method in question is intended to entirely of partly form the ornamental products, such as for example bracelets, necklaces, watch straps and similar articles made of metal, precious metal such as for example gold or platinum or their alloys or non-precious metal such as for example steel or other alloys.

STATE OF THE ART

Ornamental articles comprising at least one link made of precious or semi-precious material, consisting of a weave of strands or strings made of precious material braided together, in a manner similar to that of a normal knitted fabric, have been known over time.

The production of such ornamental articles with links made of braided strands made of precious material entails numerous limitations to the structural and morphological characteristics of the end articles that can be obtained.

Thus, the main drawback of these articles of the known type lies in the fact that the weaving of the strands required to obtain the link made of precious strands limits the possibility of varying the final appearance of the articles, in that it is not possible to create surface pattern shapes or motifs of particular aesthetic appeal given that the braided strands are all identical and simply braided.

As a matter of fact, though the sizes of the strands vary and the shape of the weft warped with strands made of precious metal, the appearance of the obtained ornamental articles is excessively limited.

A further drawback lies in the fact that the weaving of the strands made of precious metal when weaving a link does not allow to optimise some mechanical properties, such as flexibility for example if not to the detriment of others such as surface continuity for example, hence the desired flexibility can be obtained only by leaving suitable spaces between the strands.

Known are ornamental articles made of precious metal obtained by mutually coupling single elements arranged adjacent to each other by mechanically coupling them to each other, by concatenating them in sequence for example on a plane or by connecting them using third elements such as for example pins when making watch straps.

Such articles are very complex to obtain and have mechanical and external limitations due to the couplings between the various elements that form the link.

The methods for producing ornamental articles outlined above, whether links with braided strands or elements concatenated or coupled to each other are rather demanding to make and often require major manual intervention.

Known is a further method for making an ornamental article, which provides for applying the lost-wax casting technique, in particular a precision-casting method, which consists in preparing a wax model, having the same shape as the jewel to be made. A layer of thermosetting resins and ceramic granules, which together form a very resistant mould external to the wax, is placed around the model. The wax is subsequently molten and removed from the mould, for example by heating the oven. Lastly, the precious metal which will form the ornamental article is cast into the mould, forming the jewel, which is removed from the mould and polished upon cooling. Such method allows to produce an ornamental article of any shape and size.

A drawback of the ornamental articles obtained through such method lies in the high production cost also due to the high consumption of third materials for obtaining the mould, which, become a waste product to be disposed after making the ornamental article.

A further drawback of the ornamental articles obtained by means of such method lies in that they are not elastic, thus making the production of links made of precious material provided with the desired flexibility impossible to obtain.

In order to overcome at least some of the drawbacks of the ornamental articles of the known type described up to now, ornamental articles with links obtained by intertwining rings made of precious or semi-precious material have been known in the industry over time.

More in detail, such links with rings are obtained by concatenating each ring made of precious material (such as gold or silver for example) with other similar rings made of precious material, each one of which is connected to the other three similar rings.

In this manner, varying thickness and the diameter at the centre of each ring allows obtaining a link with different weft and capable of offering a different aesthetic appearance to a user or buyer.

However, even such links obtained by concatenating a plurality of rings made of precious material revealed some drawbacks too.

The main drawback lies in the fact that the method for making them requires a step for welding each ring once inserted into the corresponding adjacent ring. Such welding requires extremely high precision by the operator so as to avoid the formation of coarse and aesthetically unappealing welding points and thus obtain a high-quality link.

In this context, not only is such implementation method very long and costly, but the end result of the link thus obtained depends a lot on the ability of the operator welding each ring.

A further drawback lies in the fact that the rings forming the link obtained through the aforementioned have—on the surface—the welding mark for the concatenation thereof, thus blemishing the entire link thus obtained.

A further drawback lies in the fact that the possible variation of weaves is very limited, in particular limited to the choice of the diameter thickness of the central hole of the rings forming the link, and thus aesthetically captivating and/or trendy shapes cannot be obtained.

A 3D printing technique, which allows creating complex shapes through the vertical superimposition of layers of molten material (normally plastic), up to obtaining the desired object, has been developed over the last years.

In particular, it is possible to obtain chains made of precious or semi-precious material without having to weld the rings that form it.

As known from the U.S. Pat. No. 9,027,320, the method of the known type for making an ornamental article initially provides for a design and a 3D drafting step obtained by means of a common drafting software, such as AutoCAD for example.

Subsequently provided for is a step for removing the draft obtained in the previous design step so as to implement it in a 3D printer, which automatically forms the object by means of the subsequent superimposition of layers of low melting point plastic material, such as polymeric resin for example.

Upon obtaining the plastic material model of the desired ornamental article, provided for is a step for inserting the latter into a casting vat made of metal material.

Subsequently provided for is a step for filling the casting vat with chalk-based plaster, which is a refractory material and has a melting point above 1000° C.

Once the plaster solidifies, provided for is a firing step, in which the casting vat is heated up to melting the plastic material which forms the model of the ornamental article to be formed, and then such plastic material is removed subsequently, thus releasing a mould shaped similar to the ornamental article to be formed.

Subsequently provided for is a casting step, in which a precious or semi-precious metallic material in molten state is cast into the casting vat. Such molten metal penetrates into the chalk-based plaster, into the grooves of the mould freed of the previously removed plastic material, taking the shape thereof.

Once the molten metal solidifies, the plaster is removed, thus obtaining the desired ornamental article.

Even the method for making an ornamental article of the known type described briefly up to now, revealed some drawbacks too.

The main drawback lies in the fact that the surfaces obtained by means of the aforementioned method reveal excessive roughness, due to the subsequent superimposition of layers obtained through 3D printing that does not allow an optimal obtainment of the lateral surfaces, which thus require a surface finishing and/or final lapping step.

A further drawback lies in the fact that the aforementioned surface finishing and/or final lapping step cannot be obtained at undercuts or at grooves, notches, and the like.

A further drawback lies in the fact that the need for casting the molten metal into the mould requires that the latter be free of capilarities or constrictions. Thus, the method described up to now does not allow to obtain ornamental articles with an extremely complex structure and small in size. Hence, such method does not allow to obtain an ornamental article comprising a link made of precious material.

A further drawback lies in the fact that the method is long, demanding and produces a high amount of waste material for each ornamental article produced.

SUMMARY OF THE INVENTION

Thus, in this context the main object of the present invention is to eliminate the aforementioned drawbacks of the prior art, by providing a method for making ornamental articles with complex shapes and simultaneously provided with at least one exposed face having a high-quality surface finishing.

A further object of the present invention is to provide a method for making an ornamental article that can be entirely customised based on the tastes of the user, in particular by varying the surface finishing, the size, the material, the colour, etc.

A further object of the present invention is to provide a method for making an ornamental article that allows to obtain it with high precision and automatically.

A further object of the present invention is to provide a method for making an ornamental article that is environmental-friendly and that substantially does not produce pollutant waste.

A further object of the present invention is to provide a method for making an ornamental article that is inexpensive, versatile and easy to manufacture.

BRIEF DESCRIPTION OF THE DRAWINGS

The technical characteristics of invention, according to the aforementioned objects, are clearly observable from the content of the claims outlined below and the advantages thereof will be more apparent from the detailed description that follows, provided with reference to the attached drawings, which represent an embodiment thereof purely by way of exemplifying and non-limiting purposes, wherein:

DETAILED DESCRIPTION

With reference to the attached figures, an ornamental article that can be obtained through the method subject of the present invention is indicated in its entirety with 1.

Figure 1:
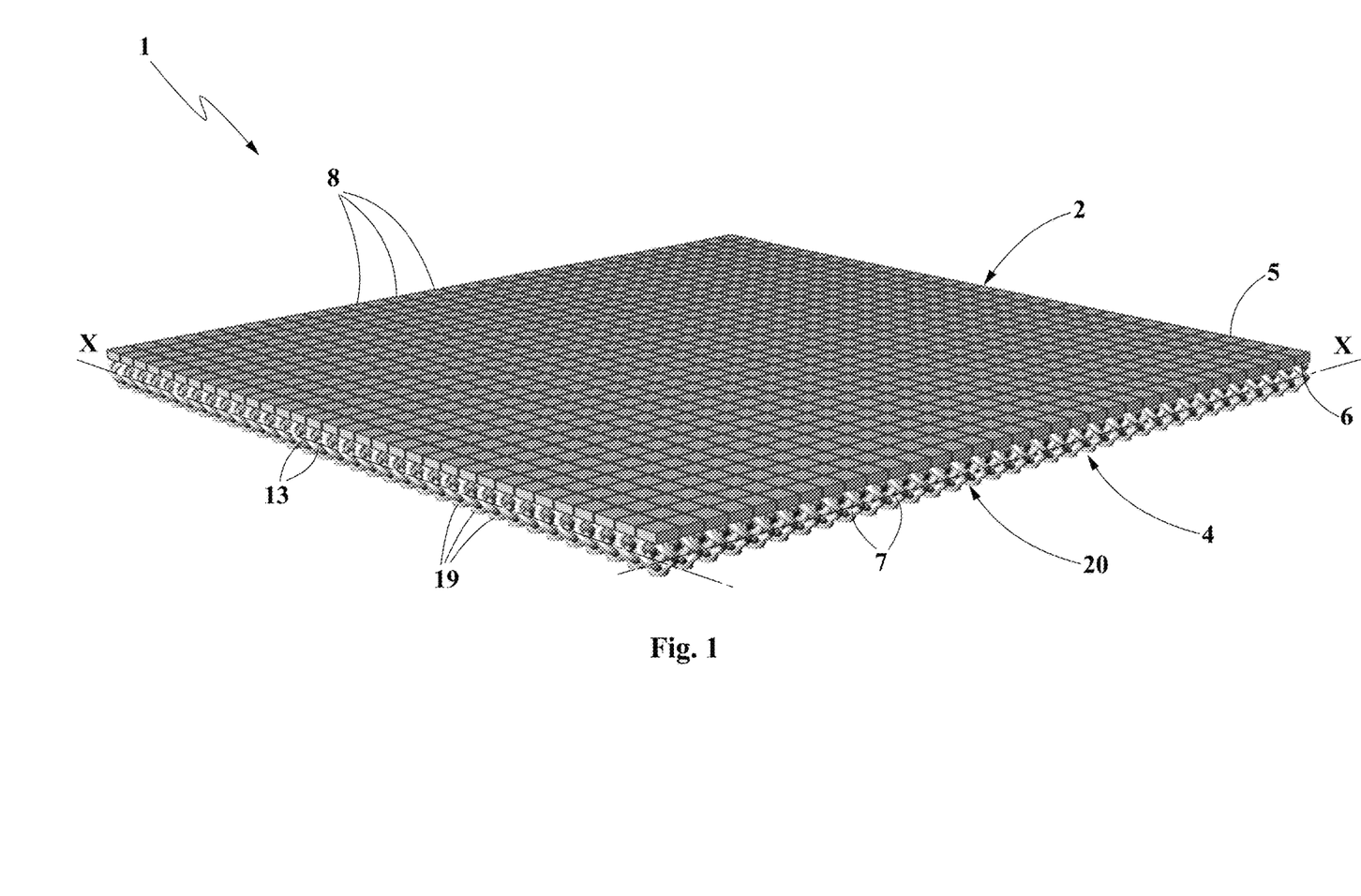
FIG. 1 shows a perspective view of an ornamental article obtained using the method subject of the present invention.
Figure 2:
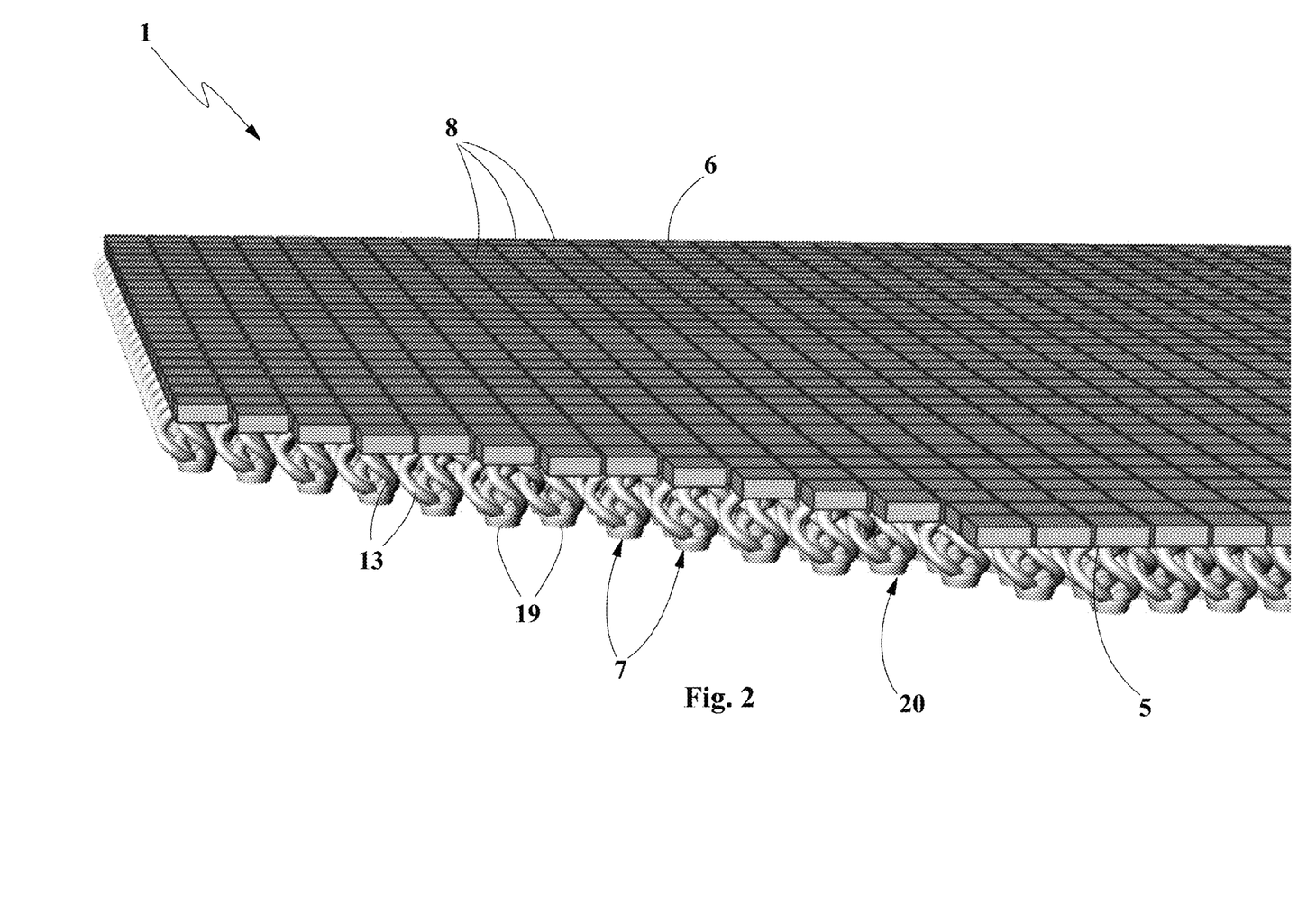
FIG. 2 shows a perspective view of a detail of the ornamental article of FIG. 1, with some parts removed so as to highlight others better.

The method for making an ornamental article subject of the present invention comprises a succession of operating steps, which lead to obtaining the ornamental article 1, illustrated in its exemplifying but non-limiting embodiment in the attached FIGS. 1 and 2.

The method subject of the present invention comprises at least one step for augmenting, in a 3D printer, an ornamental body 4 formed by a plurality of separate connection elements 7 mechanically engaged with each other. Such augmenting step is obtained through successive welding of metal powder layers, preferably but not limitedly precious or semi-precious metallic material.

The expression precious or semi-precious metal is used hereinafter to indicate any metal used for making the ornamental article well-known to a man skilled in the art, such as for example gold, silver, platinum and/or their alloys even using non-precious material, such as for example copper, nickel ad others.

The method according to the invention is also suitable for making ornamental articles made of non-precious metal, such as for example steel, for example for making watch straps and generally for producing articles for the watch manufacturing industry.

According to the idea on which the present invention is based, the method for making an ornamental article further comprises a step for preparing at least one finish plate 2 made of metallic material, for example precious or semi-precious, provided with an inner face 5 and an outer face 6, in said 3D printer.

Advantageously, the finish plate 2 is obtained by means of a per se known metallurgic process for example mould casting molten metal, die-casting, casting and laminating, precision-casting, coining, moulding, injection moulding (metal injection moulding, "MIM" in the technical jargon of the industry) and/or other conventional processes per se clearly known to a man skilled in the art.

Furthermore, the metallurgic process for obtaining the finish plate 2 may in turn comprise a 3D printing of metals.

In this context, the method further preferably provides for a step for the surface cleaning of the finish plate 2 to enhance its external appearance.

In this manner, the quality of the metal crystals forming the finish plate 2 can be controlled, by controlling the temperature, pressure and forming which are substantially possible in all known metallurgic processes, with the aim of obtaining the desired mechanical and exterior properties for the finish plate 2 and suitable for making an ornamental article of supreme aesthetic quality.

For example, the finish plate 2 may consist of a strip for example gold with a thickness of 0.1-5 mm and preferably with a thickness of 0.2-3 mm.

The method subject of the present invention further provides for preparing a finish plate 2, advantageously provided with optimal exterior properties, and which will be exposed in the finished article 1.

According to a distinctive characteristic of the present invention, the aforementioned augmenting step provides for obtaining at least one initial welding of a first layer made of metal powder, for example precious or semi-precious, on the inner face 5 of the aforementioned finish plate 2 in order to fix the plurality of connection elements 7 of the ornamental body 4 to the finish plate 2.

According to an embodiment not illustrated in the attached figures, the method may provide for a step of interposing an intermediate element, arranged on the inner face 5 of the finish plate 2.

According to the latter embodiment, the augmenting step on the inner face 5 occurs starting from the aforementioned intermediate element.

Such intermediate element may for example comprise a further plate, for example made of non-precious metal, or one or more spacers, preferably made of metallic material.

The method for making an ornamental article according to the invention further comprises a step for cutting the finish plate 2 into a plurality of separate surface elements 8 adjacent to each other, mechanically connected to the plurality of connection elements 7.

Besides separating the aforementioned plurality of surface elements 8, the cutting step of the method according to the invention also advantageously comprises the separation of the ornamental article 1 (i.e. the assembly formed by the ornamental body 4 and by the plurality of surface elements 8) from a perimeter waste 21 of the finish plate 2.

Figure 10:
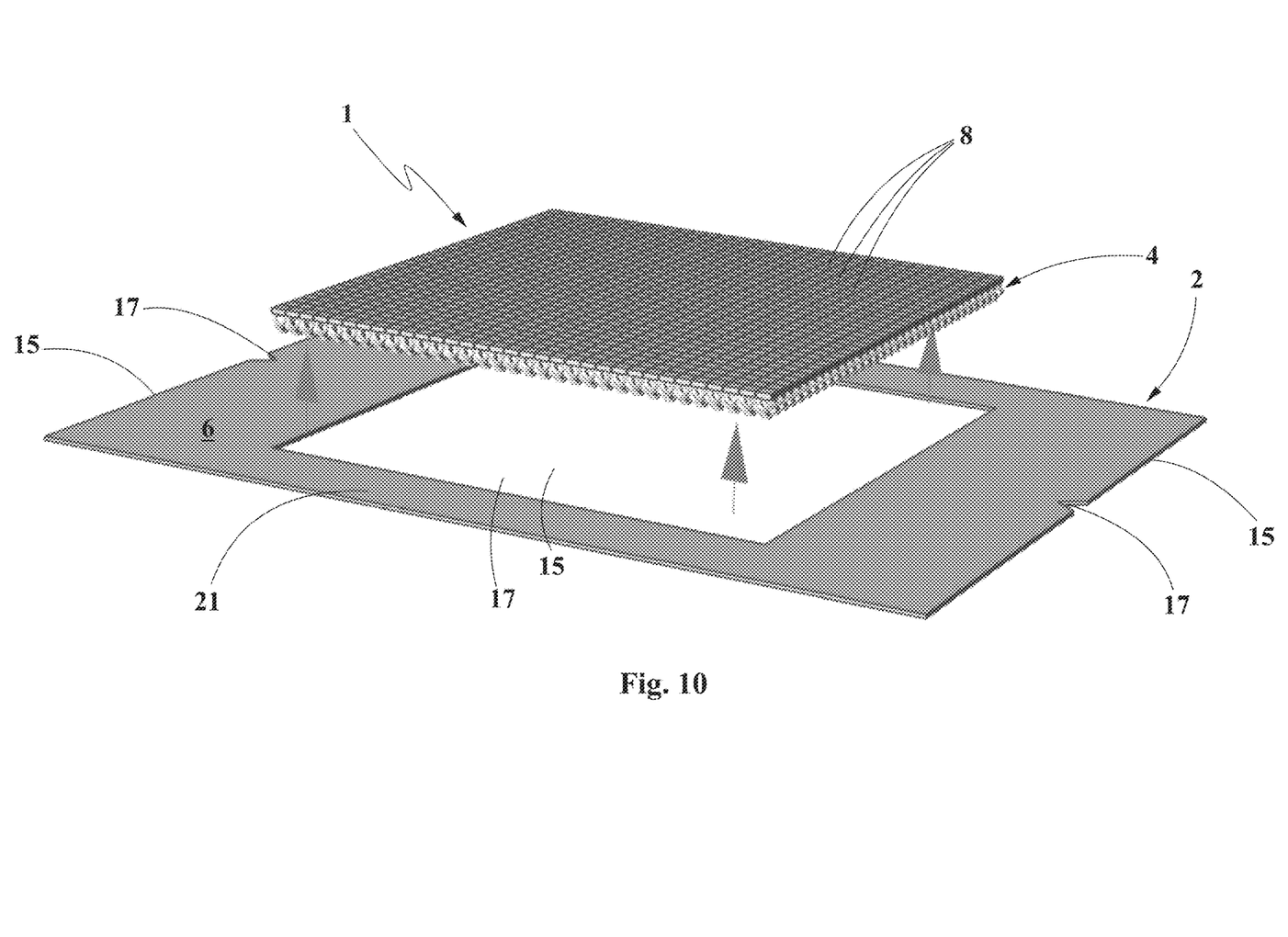
FIG. 10 shows a step for separating the ornamental article from the finish plate following the cutting step of FIG. 9.

According to the attached FIG. 10, once separated in the cutting step the waste is advantageously moved away from the ornamental article 1.

The surface elements 8 are of high quality given that they are obtained starting from a high-quality finish platen given that it is obtained through a metallurgic process and through a precise cutting step, for example obtained through laser cutting as outlined further hereinafter, and a plurality of connection elements 7, which are substantially visible with the ornamental article in use, are fixed.

Advantageously, once finished, the ornamental article will have exposed (in the normal use of the article) mainly the outer face 6 of the surface elements 8, which—thanks to providing for the increase of the metal powder layers on the inner face of the finish plate—will have an optimal finishing on the outer face; this optimal surface finishing swill not be affected by the cutting step.

The step of augmenting the ornamental body 4 on the finish plate 2 is advantageously obtained by welding—using a laser beam—successive layers of precious or semi-precious metal powder in the three-dimensional moulding machine.

The ornamental article 1 that can be obtained through the method subject of the present invention is thus provided with surface elements 8 with high-quality mechanical and exterior properties and with the ornamental body 2, obtained through 3D printing, which consists of a plurality of connection elements 7 mechanically connected to each other.

The connection elements 7 of the aforementioned plurality of connection elements 7 can be variously shaped and dimensioned depending on the characteristics of the article one wants to obtain (strap, necklace, bracelet etc.).

According to the preferred embodiment illustrated in the attached figures, the preparation step (illustrated in the attached FIG. 3) provides for inserting the finish plate 2 into a seat 9 of a support base 3 housed in a provided augmenting chamber of a 3D printer, which is not described in detail in that well-known to a man skilled in the art.

Figure 3:
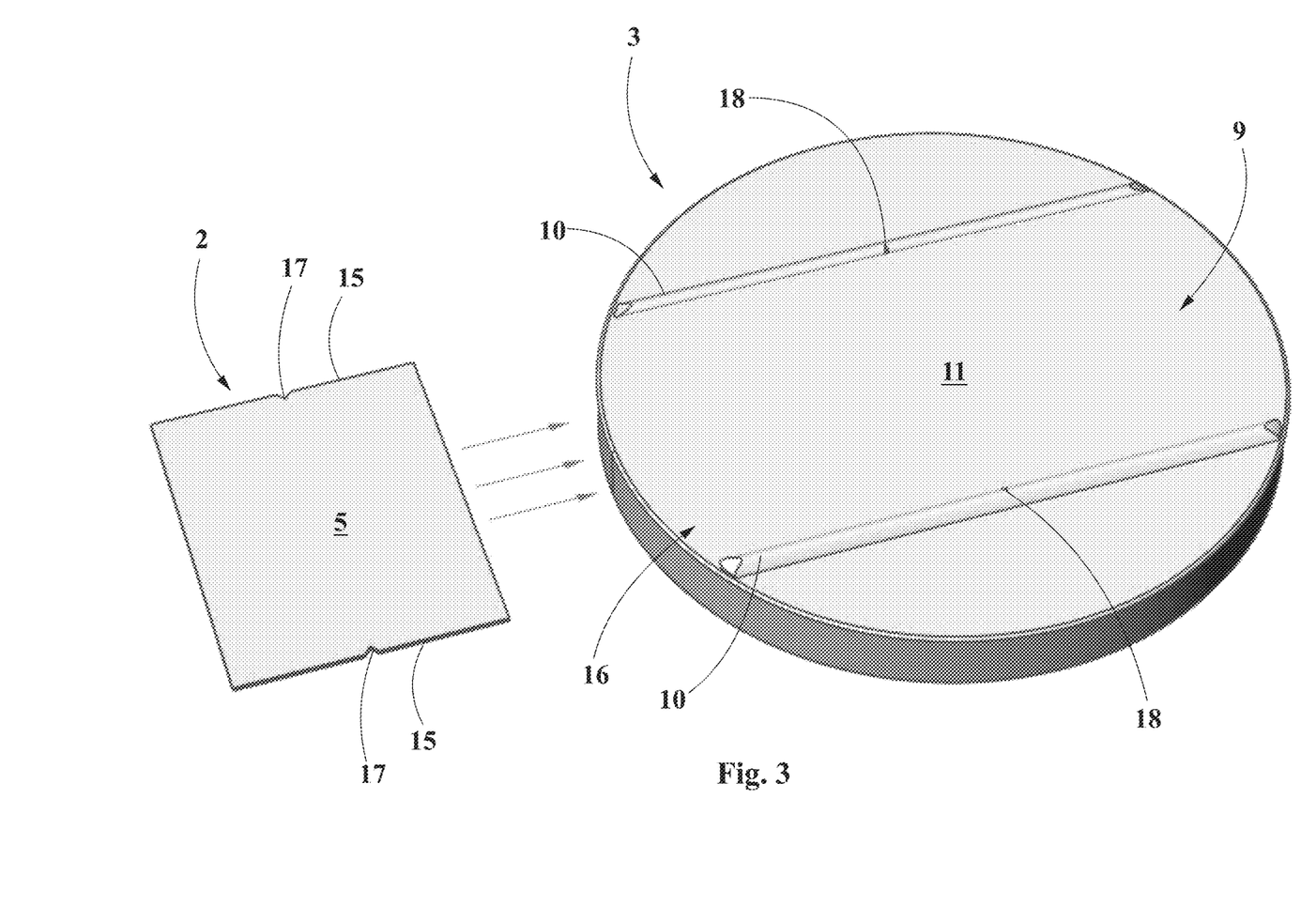
FIG. 3 shows a step of preparing the method for making an ornamental article subject of the present invention, wherein the finish plate is arranged on a support base.
Figure 4:
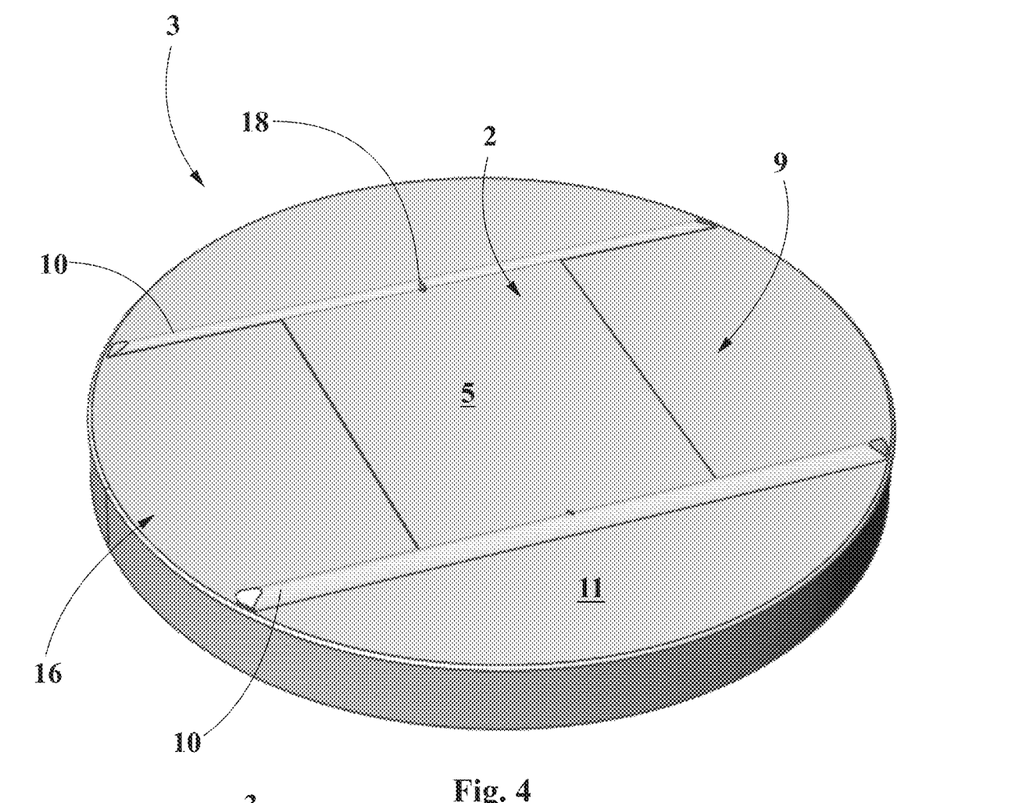
FIG. 4 shows an axonometric view of the support base of FIG. 3 carrying the finish plate housed thereon.
Figure 5:
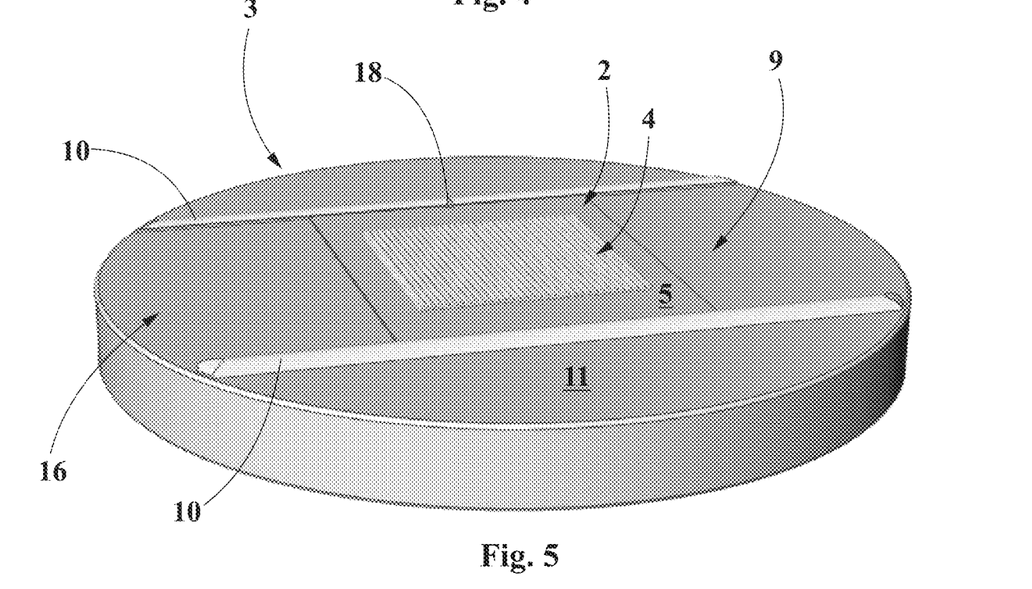
FIG. 5 shows a perspective view of the finish plate housed on the support base subsequently to an augmenting step of the method subject of the present invention.
Figure 6:
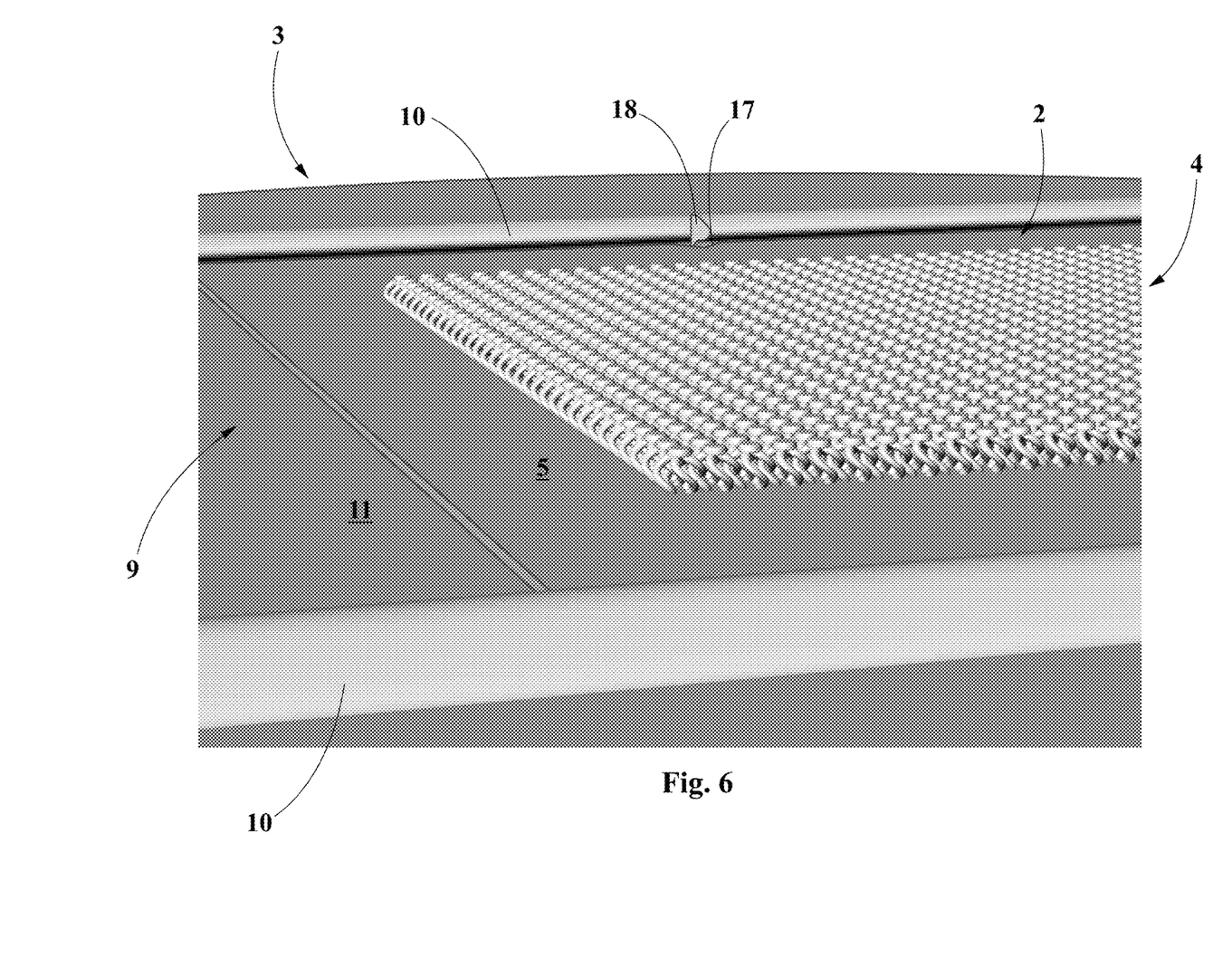
FIG. 6 shows a perspective view of an enlarged detail of FIG. 5 i.e. the finish plate housed on the support base, following the augmenting step of the method subject of the present invention.
Figure 7:
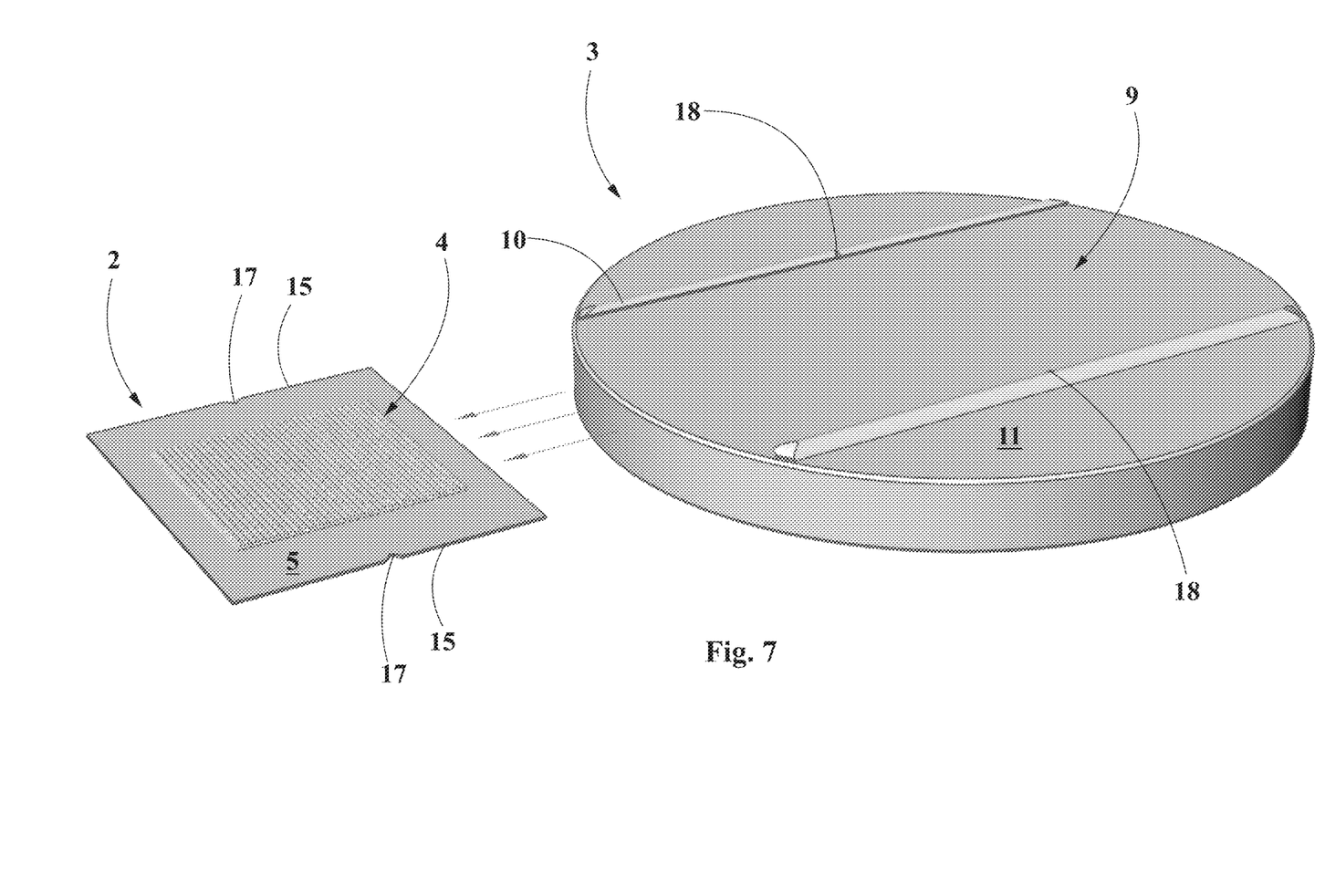
FIG. 7 shows a removal step of the method for making an ornamental article subject of the present invention, wherein the finish plate is removed from the support base, after the augmenting step.

More in detail, the seat 9 remains defined between two sides 10 (preferably parallel) provided for on a working wall 11 of the support base 3.

The finish plate 2 is advantageously inserted into the seat 9 of the support base 3 with the outer face 6 facing towards the working wall 11.

Preferably, the sides 10 are each provided with an undercut projecting portion, counter-facing the working wall 11 of the support base 3. Such projecting portions are arranged at a height of the working wall 11 substantially equal to the thickness of the finish plate 2, so as to allow a fitting insertion into the seat 9.

This allows obtaining a mechanical engagement of the finish plate 2 on the support base 3 so as to avoid the risk of inadvertent displacement of the plate 2 during the subsequent step for augmenting the ornamental body 4 of the ornamental article 1.

In order to form the ornamental body 4 in the desired position on the finish plate 2, the latter must be positioned precisely with respect to the sides 10. To this end, the finish plate 2 is provided with at least one first alignment element 17 designated to be aligned with a second alignment element 18 provided on the support base 3 and advantageously on the side 10.

According to the preferred embodiment illustrated in the attached figures, the first alignment element 17 comprises a first groove obtained at at least one of the lateral edges 15 and preferably on both lateral edges 15 of the finish plate 2, in particular in a substantially centred position with respect to the extension of such lateral edges 15.

Similarly, the second alignment element 18 comprise a second groove obtained at at least one of the sides 10, preferably at both sides 10 and in particular in a substantially central position, at then undercut projecting portions of the sides 10.

In order to form the ornamental body 4 during the augmenting step, the method for making an ornamental article 1 subject of the present invention provides for using a method for forming successive layers, known in the technical jargon of the industry as "additive manufacturing."

More in detail, during the augmenting step the method advantageously comprises a step for preparing a three-dimensional draft file of the ornamental body 4 of the desired ornamental article 1. Such preparation step is provided for before the augmenting step.

More in detail, the step for preparing draft files initially provides for a step for designing the ornamental body 4 of the desired ornamental article and subsequently the transposition thereof into a three-dimensional draft file, for example by means of a first 3D CAD (Computer-Aided Drafting) software, such as for example AutoCAD® and the like.

Preferably, then three-dimensional draft file is stored in a computer memory, for example in "3DM" format.

Advantageously, the first CAD software converts the draft from "3DM" format to an "STL" (STereo Lithography interface format) format which discretises the three-dimensional draft into triangles and tetrahedrons, to facilitate the computer for the subsequent operating steps provided for by the method subject of the present invention.

The method for making an ornamental article 1 further preferably provides for a step for defining a plurality of sections of the draft by intersecting a plurality of sectioning planes parallel to the laying plane X with the three-dimensional draft of the ornamental body 4 of the ornamental article 1.

Advantageously, the distance between two adjacent sections is comprised between 0.005 mm and 0.05 mm and in particular it is comprised between 0.01 mm and 0.03 mm.

Such step for defining the sections is normally obtained by means of a second CAD or CAM (Computer-Aided Manufacturing) software which preferably imports the three-dimensional draft file in "STL" format and intersects it with a plurality of planes substantially parallel to the laying plane X of the ornamental article 1.

Operatively, by means of the graphic interface of the second CAD or CAM software, for example using a computer screen, the operator enters the parameters regarding the distance between the aforementioned parallel planes, depending on the type of material the ornamental article 1 is to be made of and based on the type of laser used, as described in detail hereinafter.

Furthermore, the method preferably provides for step for designing a welding path in the contours of the sections of the ornamental body 4 of the ornamental article 1 and the step for importing the three-dimensional draft sections in the aforementioned 3D laser printer.

Preferably, the welding path is fully contained in the contours of the sections defined during the aforementioned definition step.

The welding path prepared in the contours of the sections describes a points map designated to pass the at least one laser beam, in the augmenting step described in detail hereinafter.

As mentioned above, the augmenting step is obtained through subsequent weldings of a precious metal powder using the aforementioned laser beam, advantageously provided for in the 3D laser printer.

More in detail, the laser beam designated to obtain the successive weldings provided for during the augmenting step is controlled to pass along the welding path designed during the aforementioned step for designing the welding path.

More in detail, the 3D laser printer is advantageously of the type for direct casting of the metal powder by means of a laser beam, and in particular for example of the DMLS (Direct Metal Laser Sintering) type, per se known to the man skilled in the art. The 3D printer comprises a work plane made of metallic material on which the precious metal powder is spread using a spatula made of rubbery material, in successive layers each with thickness equal to the distance between two contiguous sections.

According to a preferred embodiment not illustrated in the attached figures, the thickness of each layer of precious or semi-precious metals, for obtaining successive weldings during the augmenting step is comprised between 0.005 mm and 0.05 mm and in particular it is comprised between 0.01 mm and 0.03 mm.

The 3D laser printer is preferably of optical fibre type and operating in pulsed regime.

The augmenting step is carried out at each section of the three-dimensional draft of the ornamental article 1, starting from the first metal powder layer, so as to fix in particular by welding, the ornamental body 4 intended to be obtained through 3D printing directly on the finish plate 2.

During each cast in the augmenting step, the laser beam hits the precious metal powder at the welding path prepared during the designing step and imported in the 3D printer during the step for importing sections of the three-dimensional draft of the ornamental article 1.

The precious metal powder hit by the laser beam heats and quickly reaches the melting point, solidifying at the sections, forming the ornamental body 4 of the ornamental article 1 one layer at a time. As a matter of fact, following the melting of a powder layer along the path, the spatula carries a new layer of precious metals and the 3D printer automatically commands the laser beam to move along the path prepared in the subsequent section of the ornamental article.

Otherwise, according to a further embodiment, the augmenting step of the method subject of the present invention may be obtained using the 3D printer for metals that does not provide for the use of a laser beam, such as for example a 3D printing by depositing subsequent layers of previously treated metal particles, for example softened by means of heating.

Still otherwise, the augmenting step of the method subject of the present invention may be obtained through electric deposition of successive layers of metal particles, for example plasma electric charges, by using a movable arm carrying mounted, on a free end thereof, a welding head.

The welding head can be controlled by means of a numerical control (CNC) to deposit the aforementioned metal particles in successive layers through electric deposition in pre-established points, so as to form the ornamental body 4 of the desired ornamental article.

In order to make the ornamental article 1 achieve the desired density, the welding step provides for that the segments and the curves forming the welding path be arranged at different distances depending on the metals that form the precious metal powder and it additionally provides for that the at which it moves and the power at which the laser beam hits the welding path vary based on the aforementioned desired density desiderata and based on the metals that form the precious metal powder.

Generally, the segments and the curves that form the welding path are arranged at an average distance between segments and/or adjacent lines that form the welding path comprised between 0.02 mm and 0.08 mm.

In particular, if the precious metal powder mainly comprises gold, silver or platinum, the average distance between segments and/or adjacent lines of the welding path is comprised between 0.02 mm and 0.05 mm.

The speed at which the laser beam covers the welding path during each augmenting step is preferably comprised between 250 and 1300 mm/s.

In particular, if the precious metal powder mainly comprises gold, silver or platinum, the speed at which the laser beam covers the welding path is comprised between 300 and 600 mm/s.

The power of the laser beam during each welding of the augmenting step is preferably comprised between 80 W and 130 W.

In particular, if the precious metal powder mainly comprises gold or platinum, the power of the laser beam is comprised between 95 W and 125 W.

The optimal density for the aforementioned precious metals, i.e. gold, silver and/or platinum, is achieved through a laser beam provided with the aforementioned speeds for covering the welding path and with the aforementioned power.

In this context, the cooled and hardened metal following the welding steps, is provided with an internal porosity comprised between 0.1% and 0.3%, which is considered very low by a man skilled in the art.

Preferably, at the end of the augmenting step, the method provides for a step of removing the surplus precious metal powder, for example manually using a brush, so as to recover it and potentially use it to make a new ornamental article 1.

Advantageously, following the cutting step, the method further comprises at least one surface finishing at least of the outer face 6 of the plurality of surface elements 8 of the finish plate 2, so as to obtain the mechanical removal of the residual product of the augmenting step and/or of the cutting step, in particular casting burrs of augmenting or laser cutting step. Such step is particularly suitable to confer an optimal surface finishing to the outer face 6 or the ornamental articles 1 intended to be admired by the users.

More in detail, the surface finishing step may be obtained in a manner per se known to a man skilled in the art, through the surface diamond grinding method, i.e. using a diamond grinding disc susceptible to be controlled by means of an electronic control unit through the numerical control (CNC) method. In particular, the electronic control unit controls an articulatable arm carrying—mounted thereon—a diamond grinding disc at an end thereof free to rotate sliding on the first exposed face 5 of the ornamental article 1.

Otherwise, the surface finishing may be obtained through sanding, per se well-known to a man skilled in the art, and obtained through manual positioning by an operator on an abrasive belt driven in rotation by an electric motor, so as to polish the outer face 6 by abrasion.

Still otherwise, the surface finishing step can be obtained through tumble finishing per se well-known to a man skilled in the art of jewellery.

The surface finishing step may also provide for obtaining at least one surface decoration at the outer face 5 of the surface elements 8, for example by means of a laser beam.

The surface decoration provided for in the surface finishing may for example be aimed at obtaining—on the outer face 5—drawings and/or writings customised upon request by the end user of the ornamental article, for example the mane initials laser-engraved on the watch strap.

According to a preferred embodiment illustrated in the attached figures, the cutting step provides for cutting the finish plate 2 by means of at least one laser beam controlled in the aforementioned plurality of surface elements 8.

Figure 9:
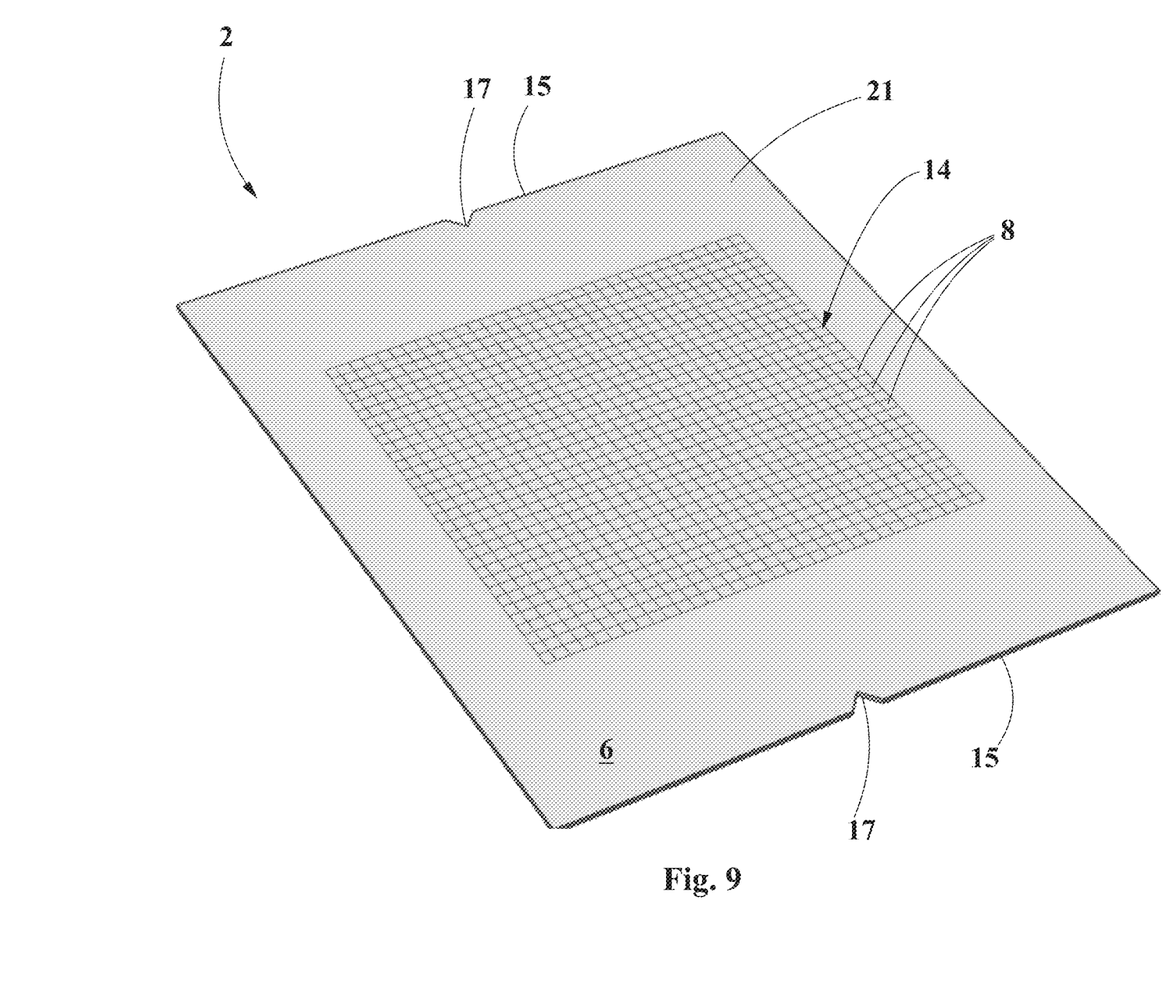
FIG. 9 shows an axonometric view of the finish plate in a cutting step of the method for making an ornamental article subject of the present invention.

According to the embodiment of FIG. 9, the method further provides for a second step of programming a cutting path 14, for example of the chequered type, for forming the plurality of surface elements 8 fixed, by means of the first welding, to the plurality of connection elements 7.

Preferably, the cutting step of the method subject of the present invention provides for that each surface element 8—at the end of the cutting—is integrally joined to a corresponding connection element 7 augmented on the finish plate during the relative augmenting step. In this manner, each connection element 7—carrying at least one corresponding surface element fixed thereon—can be displaced with respect to the connection elements 7 contiguous and mechanically connected thereto.

According to a different embodiment not illustrated in the attached figures, each surface element 8 is fixed to more than one connection element 7 of the ornamental body 4. For example, each surface element 8 is fixed—by means of the inner face 5 thereof—to two connection elements 7 of the ornamental body 4.

Advantageously, the cutting step provides for that the power and the focusing the laser that hits the outer face 6 be selected in a manner such that the finish plate 2 is fully cut and that the laser beam light does not hit the connection elements 7 fixed on the inner face 5 of the finish plate 2.

The method according to the present invention further preferably comprises, before the cutting step, a step for removing the finish plate 2 carrying—fixed on the inner face 5—the ornamental body 4 of the ornamental article 1 of the seat 9 of the support base 3.

Figure 8:
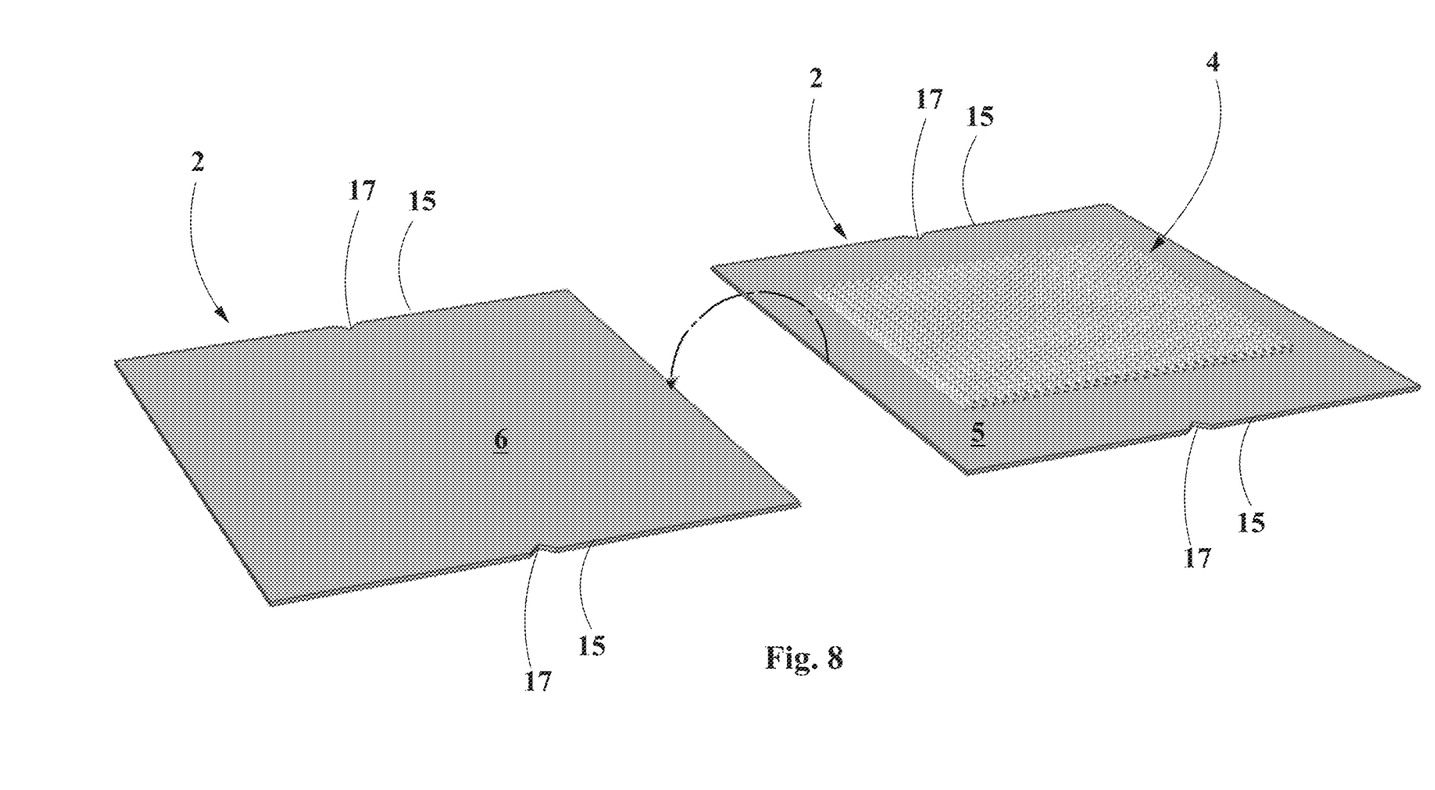
FIG. 8 shows an axonometric view of the finish plate in a rotation step of the method for making an ornamental article subject of the present invention.

Subsequently, the method further advantageously provides for a step (illustrated in the attached FIG. 8) for rotating the finish plate 2 carrying—fixed—the ornamental body 4 for turning the outer face 6 of the plate 2 upwards.

According to the preferred embodiment illustrated in the attached FIG. 9, the cutting step of the method according to the invention is obtained on the outer face 6 of the finish plate 2, so as to avoid the risk of ruining the ornamental body 4 when moving the laser beam to cut the finish plate 2.

According to a variant embodiment not illustrated in the attached figures, the method for making an ornamental article 1 subject of the present invention further comprises a step for applying at least one ornamental element on the outer face 6 of the finish plate 2 before the step for preparing the support base 3.

The expression "ornamental element" shall be used to indicate any type of surface finishing, which for example comprise the formation—in a single body—of ring nests for setting precious stones, or means for fixing decorative elements of any type, material and shape.

For example, the application step may provide for fixing ornamental elements made of precious or semi-precious metallic material, such as for example geometric shapes (for example circles, squares, hexagons, etc.) or, more generally, decorative shapes (for example hearts, stars, letters, etc.).

The application step may also provide for applying—on the outer face of the finish plate 2—relief elements, such as for example embossing, precious stones or other decorations per se well-known to a man skilled in the art.

According to the preferred embodiment illustrated in the attached figures, the augmenting step of the method subject of the present invention provides for forming, starting from the inner face 5 of the finish plate 2—for each connection element 7 of the ornamental body 4—at least three shanks 13 which generate—between pairs of such shanks 13—at least three corresponding through-passing openings into which the three shanks 13 of three corresponding contiguous connection elements are inserted.

In this manner, the shanks 13 of each connection element 7 embraces a corresponding shank 13 of a contiguous connection element 7 forming a mechanical connection of the chain type with two dimensions along the laying plane X.

According to the preferred embodiment illustrated in the attached figure, and with particular reference to the detail illustrated in the attached FIG. 2, the augmenting step provides for providing each connection element 7 with four separate shanks 13, which define four corresponding through-passing openings traversed by four shanks of four corresponding contiguous connection elements 7.

Preferably, the augmenting step further provides for making for each connection element 7 at least one bottom element 19 juxtaposed to the corresponding surface element 8 of the finish plate 2. The shanks 13 of each connection element 7 are advantageously arranged to connect the corresponding bottom element 19 with the corresponding surface element 8.

The bottom elements 19 of the connection elements 7 define a resting surface 20 for the ornamental article 1, which is designated to rest on the skin of the user with the ornamental article in use.

The method according to the invention further preferably comprises a step for removing the roughness of the bottom element 19, so as to remove the surface roughness formed during the augmenting step by means of 3D printing.

In particular, the removal step provides for cleaning the bottom elements 19 using a laser beam and/or using a milling machine or a diamond disc grinder susceptible to be controlled by means of an electronic control unit using the numerical control (CNC) method.

According to a different embodiment not illustrated in the attached figures, the method may differently provide for the cutting step before the step for augmenting the ornamental body 4.

In this context, the surface elements 8, obtained from the step for cutting the finish plate and following the step of arranging them on the working wall 11 of the support base 3, are faced towards the latter with the outer face thereof so that—on the inner face thereof—the ornamental body 4 is subsequently formed during the augmenting step, in a manner entirely similar to the one described above.

According to the latter different embodiment, the seat 9 of the support base 3 is provided with a superficial conformation that is counter-shaped with respect to the plurality of surface elements 8 so as to allow the stable anchoring thereof during the augmenting step.

According to a different and further embodiment, the method subject of the present invention provides for obtaining surface elements 8 through a moulding step instead of through a cutting step.

Such step may for example provide for the casting of molten metal in moulds, or high-pressure injection die-casting in a metal mould, or other metallurgic processes per se clearly known to a man skilled in the art and suitable for forming the surface elements 8.

Advantageously, such moulding step allows obtaining surface elements 8 of any shape and size, so as to confer the desired exterior appearance to the ornamental article 1.

According to the latter embodiment, the method subject of the present invention does not provide for a cutting step, in that the surface elements 8 are obtained already separated from each other.

Subsequently, the method advantageously provides for a step for housing the surface elements 8 in the seat 9 of the support base 3 of the 3D printer. Such seat 9 advantageously comprises a superficial conformation counter-shaped to fittingly receive the surface elements 8 obtained during the moulding step.

Following the housing step, the method according to the latter embodiment provides for obtaining the augmenting step above the surface elements 8 and all other operating steps provided for in the other embodiments according to the invention, in a manner entirely similar to the one described above.

Described below is an ornamental article, that can be advantageously obtained through the method described up to now, whose reference numbers shall be maintained for the sake of ease of description.

The ornamental article 1 comprises an ornamental body 4 formed by a plurality of connection elements 7 mechanically engaged with each other along a laying plane X.

The plurality of connection elements 7 carries—fixed—a plurality of surface elements 8 adjacent to each other obtained by means of a metallurgic process.

The expression metallurgic process will be used to indicate a process for forming and machining metals per se known to a man skilled in the art, for example casting molten metal in moulds, die-casting and other processes of the known type.

The plurality of connection elements 7 of the ornamental body 4 of the ornamental article 1 is obtained through 3D laser printing and the plurality of surface elements 8 is obtained by cutting a finish plate 2.

In this manner, the ornamental body 4 can be obtained in any shape, and the plurality of surface elements 8 connected thereto is provided with the desired number of surface finishing, deriving from the aforementioned known metallurgic process.

According to the preferred embodiment illustrated in the attached figures, each said connection element 7 of then ornamental article 1 of the plurality of connection elements 7 comprises at least one bottom element 19 opposite to the surface element 8 and at least three shanks 13 which connect the bottom element 19 to a surface element 8 generating—between pairs of shanks 13—at least three corresponding through-passing openings concatenated with three shanks 13 of three corresponding contiguous connection elements 7.

Such connection elements 7 are thus concatenated to each other and form a flexible link, that can be worn by a user for ornamental purposes Advantageously, each surface element 8 of each connection element 7 has an overall dimension on the laying plane X of the ornamental article 1 that is greater than the overall dimension on such laying plane X of the bottom element 19.

In this manner, the ornamental article 1 has greater freedom of movement at the resting surface 20 defined by the bottom elements 19, in that they are mutually separated by crevices of greater width with respect to the crevices that separate the surface elements 8. The surface elements 8, with the ornamental article in use, substantially define a surface that is continuous and that has a great aesthetic appeal.

Obviously, each surface element 8 may be obtained with any type of shape and colour, with the aim of conferring the desired aesthetic appearance to the ornamental article 1.

According to a further embodiment, the ornamental article 1 comprises at least one ornamental element fixed—at the top part—to at least one of the surface elements 8, such as for example precious or semi-precious metal applications of any shape and colour, precious stones and/or nesting rings carrying such stones and/or gems set thereon.

Hence, the invention thus conceived attains the pre-set objects.

In particular, the method subject of the present invention allows to obtain an ornamental article 1 with high-quality surface finishing.

As a matter of fact, as known the 3D printing of metals does not allow to obtain metal objects with high surface finishing properties in that the crystalline cross-link that forma the object superficially reveals imperfections and/or defects that jeopardise the exterior appearance thereof, in particular due to the formation of roughness and surface imperfections visible to the naked eye and difficult to eliminate in that located in narrow spaces that cannot be reached by possible polishing means, given that such objects are obtained through successive laser weldings.

The present invention allows to obtain high-quality surface finishing in that the upper face of the surface elements is not obtained by means of laser welding but, differently, by means of a metallurgic process of the known type on which the ornamental body 4 is formed by means of successive laser weldings Such ornamental body is substantially not visible when the ornamental article is in use.

The invention claimed is:

1. A method for making an ornamental article, said method comprising the following operating steps:

arranging, in a 3D printer, a finish plate made of metallic material having an inner face and with an outer face;

additively, in said 3D printer, forming an ornamental body by successive welding metal powder layers such that a plurality of separate connection elements that are mechanically engaged with each other are formed on the inner face of the finish plate, wherein an initial welding of a first metal powder layer on the inner face of said finish plate mechanically fixes said plurality of connection elements of said ornamental body to said finish plate; and cutting, after said forming the ornamental body, said finish plate into a plurality of separate surface elements that are adjacent to each other and are mechanically connected to said plurality of connection elements to make an ornamental article.

2. The method of claim 1, wherein, in said cutting the finish plate, said finish plate is cut by means of at least one controlled laser beam into said plurality of surface elements.

3. The method of claim 1, wherein in said forming the ornamental body, at least three shanks are formed starting from the inner face of said finish plate, for each connection element of said ornamental body; wherein each shank of each connection element embraces a corresponding shank of a contiguous connection element.

4. The method of claim 1, further comprising, after said cutting the finish plate, surface finishing the outer face of said plurality of surface elements of said finish plate.

5. The method of claim 1, wherein, in said arranging the finish plate, said finish plate are inserted into a seat of a support base housed in an augmenting chamber of the 3D printer.

6. The method of claim 1, wherein said cutting the finish plate is attained on said outer face of said finish plate.

7. The method of claim 1, further comprising, before said cutting the finish plate, rotating said finish plate.

\* \* \* \* \*